(12) United States Patent
Hopkins

(10) Patent No.: US 8,095,614 B2
(45) Date of Patent: Jan. 10, 2012

(54) METHOD FOR OPTIMALLY UTILIZING A PEER TO PEER NETWORK

(75) Inventor: Samuel P. Hopkins, Freedom, PA (US)

(73) Assignee: Tiversa, Inc., Cranberry Township, PA (US)

( * ) Notice: Subject to any disclaimer, the term of this patent is extended or adjusted under 35 U.S.C. 154(b) by 908 days.

(21) Appl. No.: 11/039,981

(22) Filed: Jan. 21, 2005

(65) Prior Publication Data

US 2005/0163133 A1     Jul. 28, 2005

Related U.S. Application Data

(63) Continuation-in-part of application No. 10/764,111, filed on Jan. 23, 2004.

(51) Int. Cl.
*G06F 15/16* (2006.01)
*H04L 12/28* (2006.01)

(52) U.S. Cl. .................................. 709/208; 370/254
(58) Field of Classification Search .......... 709/227–229, 709/238–244; 370/229–240, 254–258, 328, 370/338
See application file for complete search history.

(56) References Cited

U.S. PATENT DOCUMENTS

| | | |
|---|---|---|
| 111,604 A | 2/1871 | Bailey |
| 5,949,760 A | 9/1999 | Stevens et al. |
| 5,987,011 A | 11/1999 | Toh |
| 6,069,896 A | 5/2000 | Borgstahl et al. |
| 6,076,088 A | 6/2000 | Paik et al. |
| 6,205,146 B1 | 3/2001 | Rochberger et al. |
| 6,668,289 B2 | 12/2003 | Cheng et al. |
| 6,732,180 B1 | 5/2004 | Hale et al. |
| 6,839,769 B2 | 1/2005 | Needham et al. |
| 6,855,660 B2 | 2/2005 | Tsou et al. |
| 6,918,113 B2 | 7/2005 | Patel et al. |
| 6,965,591 B1 | 11/2005 | Roy |
| 6,983,320 B1 | 1/2006 | Thomas et al. |
| 7,003,514 B2 | 2/2006 | Dutta et al. |
| 7,010,534 B2 | 3/2006 | Kraft |
| 7,035,653 B2 | 4/2006 | Simon et al. |
| 7,089,301 B1 | 8/2006 | Labio et al. |
| 7,120,145 B2 | 10/2006 | Ohba et al. |
| 7,120,619 B2 | 10/2006 | Drucker et al. |
| 7,174,382 B2 * | 2/2007 | Ramanathan et al. ........ 709/227 |

(Continued)

FOREIGN PATENT DOCUMENTS

EP     1107512 A1     6/2001

(Continued)

OTHER PUBLICATIONS

Zupeng Li et al., "Research of Peer-to-Peer Network Architecture," Proceedings of ICCT2003, pp. 312-315.

(Continued)

*Primary Examiner* — Douglas Blair
*Assistant Examiner* — Shirley Zhang
(74) *Attorney, Agent, or Firm* — Hamilton, Brook, Smith & Reynolds, P.C.

(57) ABSTRACT

The present invention relates to optimally utilizing a peer to peer network by increasing the amount of communication messages that are received. The present invention does this by eliminating under performing connections, by controlling how connections are attempted and by locating optimal connections. The present invention provides a way to increase the number of nodes that are available for searching.

15 Claims, 3 Drawing Sheets

U.S. PATENT DOCUMENTS

| | | | | |
|---|---|---|---|---|
| 7,177,295 | B1* | 2/2007 | Sholander et al. | 370/338 |
| 7,318,092 | B2 | 1/2008 | Sutler | |
| 7,327,683 | B2* | 2/2008 | Ogier et al. | 370/236 |
| 7,441,180 | B1 | 10/2008 | Kaczmarek et al. | |
| 7,574,523 | B2* | 8/2009 | Traversat et al. | 709/238 |
| 7,600,033 | B2* | 10/2009 | Bauer et al. | 709/232 |
| 2001/0003191 | A1 | 6/2001 | Kovacs et al. | |
| 2001/0037325 | A1 | 11/2001 | Biderman et al. | |
| 2002/0016786 | A1 | 2/2002 | Pitkow et al. | |
| 2002/0044549 | A1* | 4/2002 | Johansson et al. | 370/386 |
| 2002/0065832 | A1 | 5/2002 | Mack | |
| 2002/0069089 | A1 | 6/2002 | Larkin et al. | |
| 2002/0073204 | A1* | 6/2002 | Dutta et al. | 709/227 |
| 2002/0087885 | A1 | 7/2002 | Peled et al. | |
| 2002/0129140 | A1 | 9/2002 | Peled et al. | |
| 2002/0138471 | A1 | 9/2002 | Dutta et al. | |
| 2002/0143989 | A1 | 10/2002 | Huitema et al. | |
| 2002/0152262 | A1 | 10/2002 | Arkin et al. | |
| 2002/0161844 | A1 | 10/2002 | Overtoom | |
| 2002/0184310 | A1 | 12/2002 | Traversat et al. | |
| 2002/0188735 | A1 | 12/2002 | Needham et al. | |
| 2003/0005035 | A1 | 1/2003 | Rodgers | |
| 2003/0037167 | A1* | 2/2003 | Garcia-Luna-Aceves et al. | 709/238 |
| 2003/0050966 | A1 | 3/2003 | Dutta et al. | |
| 2003/0050980 | A1 | 3/2003 | Dutta et al. | |
| 2003/0055892 | A1* | 3/2003 | Huitema et al. | 709/204 |
| 2003/0078889 | A1 | 4/2003 | Lee et al. | |
| 2003/0088544 | A1 | 5/2003 | Kan et al. | |
| 2003/0095660 | A1 | 5/2003 | Lee et al. | |
| 2003/0112823 | A1 | 6/2003 | Collins et al. | |
| 2003/0126136 | A1 | 7/2003 | Omoigui | |
| 2003/0126199 | A1 | 7/2003 | Kadri et al. | |
| 2003/0145093 | A1 | 7/2003 | Oren et al. | |
| 2003/0182428 | A1 | 9/2003 | Li et al. | |
| 2003/0191828 | A1 | 10/2003 | Ramanathan et al. | |
| 2003/0195852 | A1 | 10/2003 | Campbell et al. | |
| 2003/0202468 | A1* | 10/2003 | Cain et al. | 370/229 |
| 2003/0208621 | A1 | 11/2003 | Bowman | |
| 2003/0212710 | A1 | 11/2003 | Guy | |
| 2004/0019650 | A1 | 1/2004 | Auvenshine | |
| 2004/0030651 | A1 | 2/2004 | Kim et al. | |
| 2004/0034652 | A1 | 2/2004 | Hofmann et al. | |
| 2004/0039921 | A1 | 2/2004 | Chuang | |
| 2004/0044790 | A1 | 3/2004 | Loach et al. | |
| 2004/0044996 | A1 | 3/2004 | Atallah | |
| 2004/0098370 | A1 | 5/2004 | Garland et al. | |
| 2004/0103297 | A1 | 5/2004 | Risan et al. | |
| 2004/0111604 | A1 | 6/2004 | Fournier | |
| 2004/0122958 | A1 | 6/2004 | Wardrop | |
| 2004/0133571 | A1 | 7/2004 | Horne et al. | |
| 2004/0139211 | A1 | 7/2004 | Baker et al. | |
| 2004/0143842 | A1* | 7/2004 | Joshi | 725/32 |
| 2004/0148434 | A1 | 7/2004 | Matsubara et al. | |
| 2004/0153472 | A1 | 8/2004 | Rieffanaugh, Jr. | |
| 2004/0153658 | A1 | 8/2004 | Gunyakti et al. | |
| 2004/0158630 | A1 | 8/2004 | Chang et al. | |
| 2004/0196784 | A1* | 10/2004 | Larsson et al. | 370/228 |
| 2004/0218532 | A1 | 11/2004 | Khirman | |
| 2004/0220926 | A1 | 11/2004 | Lamkin et al. | |
| 2004/0230572 | A1 | 11/2004 | Omoigui | |
| 2004/0236945 | A1 | 11/2004 | Risan et al. | |
| 2004/0250106 | A1 | 12/2004 | Annese et al. | |
| 2004/0250122 | A1 | 12/2004 | Newton | |
| 2004/0260761 | A1 | 12/2004 | Leaute et al. | |
| 2004/0260801 | A1 | 12/2004 | Li | |
| 2005/0028012 | A1 | 2/2005 | Amamiya et al. | |
| 2005/0038898 | A1 | 2/2005 | Mittig et al. | |
| 2005/0043548 | A1 | 2/2005 | Cates | |
| 2005/0060297 | A1 | 3/2005 | Najork | |
| 2005/0080858 | A1 | 4/2005 | Pessach | |
| 2005/0091167 | A1 | 4/2005 | Moore et al. | |
| 2005/0091202 | A1 | 4/2005 | Thomas | |
| 2005/0091397 | A1 | 4/2005 | Roberts et al. | |
| 2005/0108203 | A1 | 5/2005 | Tang et al. | |
| 2005/0108248 | A1 | 5/2005 | Natunen | |
| 2005/0114709 | A1 | 5/2005 | Moore | |
| 2005/0119998 | A1 | 6/2005 | Greco et al. | |
| 2005/0125374 | A1 | 6/2005 | Curtis et al. | |
| 2005/0125673 | A1 | 6/2005 | Cheng et al. | |
| 2005/0144288 | A1 | 6/2005 | Liao | |
| 2005/0163050 | A1 | 7/2005 | Hopkins | |
| 2005/0163133 | A1 | 7/2005 | Hopkins | |
| 2005/0163135 | A1 | 7/2005 | Hopkins | |
| 2005/0187942 | A1 | 8/2005 | Dutta et al. | |
| 2005/0203851 | A1 | 9/2005 | King et al. | |
| 2005/0203892 | A1 | 9/2005 | Wesley et al. | |
| 2005/0229243 | A1 | 10/2005 | Svendsen et al. | |
| 2005/0229255 | A1 | 10/2005 | Gula et al. | |
| 2005/0265259 | A1* | 12/2005 | Thubert et al. | 370/255 |
| 2005/0267945 | A1 | 12/2005 | Cohen et al. | |
| 2006/0029093 | A1 | 2/2006 | Van Rossum | |
| 2006/0034177 | A1 | 2/2006 | Schrempp | |
| 2006/0039297 | A1 | 2/2006 | McNab | |
| 2006/0117372 | A1 | 6/2006 | Hopkins | |
| 2006/0136837 | A1 | 6/2006 | Ben-Shachar et al. | |
| 2006/0209819 | A1 | 9/2006 | Jennings et al. | |
| 2006/0248062 | A1 | 11/2006 | Libes et al. | |
| 2007/0124721 | A1 | 5/2007 | Cowing et al. | |
| 2007/0162463 | A1 | 7/2007 | Kester et al. | |
| 2008/0140780 | A1 | 6/2008 | Hopkins et al. | |
| 2008/0263013 | A1 | 10/2008 | Hopkins | |

FOREIGN PATENT DOCUMENTS

| | | |
|---|---|---|
| WO | WO 03/009524 | 1/2003 |
| WO | WO 2005/074229 A1 | 8/2005 |
| WO | WO 2005/074230 A2 | 8/2005 |
| WO | WO 2006/124027 A1 | 11/2006 |

OTHER PUBLICATIONS

Marmor, Michael S., "Make the P2P Lead with Toadnode," www.webtecniques.com, Dec. 2000, pp. 44-49.

Ueda, Kiyoshi et al., "Peer-to-Peer Network Topology Control within a Mobile Ad-hoc Network," 2003 IEEE, pp. 243-247.

Liu, Jiangchuan, et al., "Distributed Distance Measurement for Large-Scale Networks," Computer Networks 41 (2003) 177-192.

Siu Man Lui and Sai Ho Kowk, "Interoperability of Peer-To-Peer File Sharing," ACM SlGecom Exchanges, vol. 3, No. 3, Aug. 2002, pp. 25-33.

Brandon Wiley, Freenet, "Inoperability Through Gateways," Chapter 19, pp. 381-392.

Zhenyun Zhuang et al., "Hyrid Periodical Flooding in Unstructured Peer-to-Peer Networks," Proceedings of the 2003 International Conference on Parallel Proceeding.

Steven Hessing, "Peer to Peer Messaging Protocol," Internet-Draft, Apr. 2002, pp. 1-57.

Mondal, a. et al., Effective load-balancing of peer-to-peer systems, Online, Mar. 2002, XP002299388 '.

Andersen, S. et al., Changes to Functionality in Microsoft Windows XP Service Pack 2 Part 2: Network Protection Technologies, Online, Sep. 15, 2004, p. 1-56, XP002330123.

Markatos, E.P., Tracing a large-scale peer to peer system: an hour in he life of Gnutella, Cluster Computing and the Grid 2nd IEEE/ACM International Symposium CCGRID2002 Berlin, Germany, May 21-24, 2002, IEEE Comput. Soc., US, p. 65-74.

Oram, A., "Peer-to-Peer: Harnessing the Power of Disruptive Technologies", Ch. 19 Interoperablity Through Gateways, Mar. 2001, p. 381-392.

Lindemann, C. et al., "A Distributed Search Service for Peer-to-Peer File Sharing in Mobile Applications", Peer-to-Peer Computing, 2002, Proceedings of the Second International Conference on Peer-to-Peer Computing, Sep. 5-7, 2002.

Findeli, M., "Peer-to-Peer (P2P) Networkgin", on Line, Jul. 1, 2001, p. 1-21.

Scarlata, V. et al., "Responder Anonymity and Anonymous Peer-to-Peer File Sharing", Proceedings of the International Conference on Network Protocols, Nov. 11, 2001, p. 272-280.

Xiao, L. et al., "Mutual Anonymity Protocols for Hybrid Peer-to-Peer Systems", Proceedings of the 23rd Intenrational Confernece on Distributed Computing Systems, May 19-22, 2003.

Goel, Sanjay et al., "A Resilient Network That can Operate Under Duress: to Support Communication Between Government Agencies During Crisis Situations." In System Sciences 2004. Proceedings of the 37th Annual Hawaii International Conference on, Jan. 5-8, 2004. Posted online: Feb. 26, 2004 10:51:19.0. (retrieved on Jun. 16, 2007) Retrieved from the Internet: URL:http://csd2.computer.org/comp/proceedings/hicss/2004/2056/05/205650123a.pdf.

Shi, W., et al., "Tuxedo: A Peer-to-Peer Caching System," Department of Computer Science, Wayne University.

Hwang, J., and Aravamudham, P., "Proxy-Based Middleware Services for Peer-to-Peer Computing in Virtually Clustered Wireless Grid Networks," School of Information Studies, Syracuse University, CST 4-291.

Kim, K., and Park, D., "Subway: Peer-to-Peer Clustering of Clients for Web Proxy," Department of Electrical Engineering and Computer Science, [on line, Retrieved on Sep. 25, 2007]. Retrieved from the Internet URL:http://66.102.1.104/scholar?hl-en&lr=&q=cache:Cljbt8-S9ckJ:ideal.cecs.missouri.edu/IMC/papers/377PD . . . .

*Tiversa, Inc., et al v. Cohen & Grigsby, P.C.*, Civil Division, Case No. GD 07/001515, Court of Common Pleas of Allegheny County, Pennsylvania, "Complaint," 89 pages, dated Sep. 5, 2007.

*Tiversa, Inc., et al v. Cohen & Grigsby, P.C.*, Court of Common Pleas of Allegheny County, Pennsylvania, "Preliminary Objections and Brief in Support of Preliminary Objections," 18 pages, dated Oct. 15, 2007.

*Tiversa, Inc., et al v. Cohen & Grigsby, P.C.*, Court of Common Pleas of Allegheny County, Pennsylvania, "First Amended Complaint," 90 pages, dated Nov. 5, 2007.

*Tiversa, Inc., et al v. Cohen & Grigsby, P.C.*, Civil Division, Case No. GD 07/001515, Court of Common Pleas of Allegheny County, Pennsylvania, "Defendant's Preliminary Objections to First Amended Complaint and Brief in Support," 14 pages, dated Nov. 21, 2007.

*Tiversa, Inc., et al v. Cohen & Grigsby, P.C.*, Civil Division, Case No. GD 07/001515, Court of Common Pleas of Allegheny County, Pennsylvania, "Court Order re: Defendant's Preliminary Objections to First Amended Complaint and Brief in Support," 14 pages, dated Nov. 27, 2007.

*Tiversa, Inc., et al v. Cohen & Grigsby, P.C.*, Civil Division, Case No. GD 07/001515, Court of Common Pleas of Allegheny County, Pennsylvania, "Second Amended Complaint," 89 pages, dated Dec. 11, 2007.

*Tiversa, Inc., et al v. Cohen & Grigsby, P.C.*, Civil Division, Case No. GD 07/001515, Court of Common Pleas of Allegheny County, Pennsylvania, "Answer to Second Amended Complaint," 454 pages, dated Jan. 30, 2008.

*Tiversa, Inc., et al v. Cohen & Grigsby, P.C.*, Civil Division, Case No. GD 07/001515, Court of Common Pleas of Allegheny County, Pennsylvania, "Reply to New Matter," 16 pages, dated Feb. 19, 2008.

Zhu, et al., "SDQE: Towards Automatic Semantic Query Optimization in P2P Systems," *Information Processing & Management*, 42(1), pp. 222-236 Oct. 26, 2004.

United States House of Representatives Committee on Government Reform—Staff Report Prepard for Rep. Tom Davis and Rep. Henry a. Waxman, "File-Sharing Programs and Peer-to-Peer Networks Provacy and Security Risk," May 13, 2003, pp. 1-12.

United States General Accounting Office, Report to the Chairman and Ranking Minority Member, Committee on Government Reform, House of Representatives, "File Sharing Programs- Peer-ToPeer Networks Provide Ready Accessto Child Pornography," Feb. 2003, pp. 1-32.

Couch, William, "Peer-To-Peer File-Sharing Networks: Security Risk," SANS Institute InfoSec Reading Room, 2002, pp. 1-11.

Davidson, Alan, "Peer-To-Peer File Sharing Privacy and Security," Center for Democracy and Technology, May 15, 2003, pp. 1-16.

AA-2002.02—File Sharing Activity Part 1 of 2—Security Implications of Using Peer-to-Peer File Sharing Software, May 12, 2002, pp. 1-5.

Mondal, A., et al., "Effective load-balancing of peer-to-peer systems," Online, Mar. 2002, XP002299388.

Phemus, "Secret Manual for Downloading: Final Second Part of Answers to Questions for Downloading", PC Japan, vol. 5, 11, pp. 174-179, Nov. 1, 2000.

\* cited by examiner

METHOD FOR OPTIMALLY UTILIZING A PEER TO PEER NETWORK

RELATED PATENT APPLICATION

This is a continuation in part of U.S. patent application Ser. No. 10/764,111 filed Jan. 23, 2004 entitled Method for Monitoring and Providing Information Over a Peer to Peer Network.

FIELD OF THE INVENTION

The present invention provides a method for optimally utilizing peer to peer networks, and, in particular, to optimally utilize peer to peer networks to increase the amount of communications messages received.

BACKGROUND OF THE INVENTION

As used herein, peer to peer networks which are the subject of the present invention comprise multiple nodes, each node typically consisting both of file server and client which can send and receive communication messages or information to or from a node to which such is connected.

In a peer to peer network each node is connected to other nodes over a communication medium such as the internet either directly or through some type of proxy. For example, when a search request is issued such originating node sends a search request to all of the nodes to which it is connected (see FIG. 1) These nodes search their list of available files and if a match is found they send a response back with the location. However, a peer to peer proxy network typically consists of node A which is connected to a node B and node B is connected to a node C. (see FIG. 2) Node A is not connected to node C such that if node A issues a search request it will be forwarded to node B and Node B will search its available files and if a match is found it will send a response back to node A. Node B will then forward node A's request to node C and Node C will search its available files and if a match is found it will send a response back to node B. Node B will then forward this response to Node A. FIG. 3 discloses a nonproxy loop network wherein each node is directly connected to another.

Some peer to peer networks utilize a leaf node/main node proxy topology (See FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node that it is connected to. The main node then forwards the request to any other leaf nodes that are connected to it and also to any main nodes it is connected to. These main nodes forward the request to any leaf nodes that are connected to them.

Accordingly it is an object of the present invention to provide a method for optimally utilizing a peer to peer network. It is yet another object of the invention to provide a method for reducing the number of connections required from a single node on a peer to peer network to view most, if not all, communication messages. It is yet another object of the invention to provide a method for optimally connecting to the network. It is yet another object of the invention to provide a method for locating nodes specific distances away from a first node.

SUMMARY OF THE INVENTION

Generally, the present invention provides a method for optimally utilizing a peer to peer network by controlling how a node connects into the network and by controlling how a node locates optimal nodes as well as by how the node interacts with the network and other nodes.

In one embodiment a first node issues a search for preselected information to help locate other nodes by watching responses. In another embodiment a first node issues a ping and compares the hops value to a predefined optimal value. In yet another embodiment a first node maintains connection statistics and compares these to a configured optimal value. In yet another embodiment a first node continuously clears its host cache at predetermined times.

In all of the embodiments, a node is configured to have one or more of the features set forth below. These features are employed in the invention to optimally utilize a peer to peer network as compared to the other network nodes on the particular network being addressed not so optimized. Thus, not all of the capabilities need to be programmed into each node in order to optimally utilize the network. The presently preferred methods of the present invention include:

- configuring a node to send pings and review the distance parameters contained in the results.
- configuring a node to send preconfigured searches and review the distance parameters contained in the results.
- configuring a node to clear or modify its host cache based on a comparison of its host cache size.
- configuring a node to clear or modify its host cache based on comparison of how long its host cache has existed.
- configuring a node to throttle its connection attempts.
- configuring a node to drop connections based on calculations of duplicate communication messages received.
- configuring a node to drop connections based on the last time a transmission was received from a connection.
- configuring a node to drop connections based on how well the connection is performing when compared to other connections.
- configuring a node to connect to other similar nodes or a master node and share processing of the network.

Other advantages of the present invention will become apparent from a perusal of the following detailed description of presently preferred embodiments of the invention taken in connection with the accompanying drawings.

DESCRIPTION OF PRESENTLY PREFERRED EMBODIMENTS

Figure 1:
FIG. 1 is a simplified schematic of a two node peer to peer network.

Generally, peer to peer networks are quite large, often a million or more nodes. To reduce the bandwidth required to operate such networks, nodes have a community imposed transmission distance limitation. Most communication messages contain communication radius parameters such as hops. Hops is a value that normally starts at 0 and increments each time the communications is forwarded. When hops reaches a preset limit, often 5, the communications is dropped from the network. This effectively enforces a community "time to live" value and limits the number of nodes that would receive the communications from a particular transmitting node. It therefore would be optimal and advantageous to connect in such a way that a node would be within reach of all communication messages.

In one embodiment of the invention a first node wishing to be optimally connected to a second node issues a search request containing a preconfigured search term. This search term can be any term but preferably one that will match many files on other nodes. As other nodes available through the second node respond to the first node, the first node looks at the hops value of their responses and compares it to a value which value can be preconfigured by the operator. Such value can be generated by a mathematical calculation based on other values, or it can be in relation to other values. If the hop value is equal or greater than the compared value, the first node will attempt to connect to the node sending the response. If the hop value is less than the compared value the first node will not attempt to connect to the node sending the response. This method allows the first node to connect to node that are N hops away from currently connected nodes and expands its communications radius.

In another embodiment, the first node connects to a second node and issues a ping rather than a second request. As other nodes available through the second node respond to the first node, the first node looks at the hops value of their responses and compares it to a value which can be preconfigured by the operator. Such value can be generated by a mathematical calculation based on other values, or it can be in relation to other values as in the first embodiment. If the hop value is more or greater than the compared value, the first node will attempt to connect to the node sending the response. If the hop value is less than the compared value the first node will not attempt to connect to the node sending the response. This method allows the first node to connect to node that are N hops away from currently connected nodes and expands its communications radius.

In another embodiment a first node seeking to locate other nodes on the network for connection purposes issues a search request containing a preconfigured search term. This search term can be any term but preferably one that will match many files on other nodes. As other nodes available through the second node respond to the first node, the first node attempts to connect to them or adds them to a cache to be connected to later.

Figure 3:
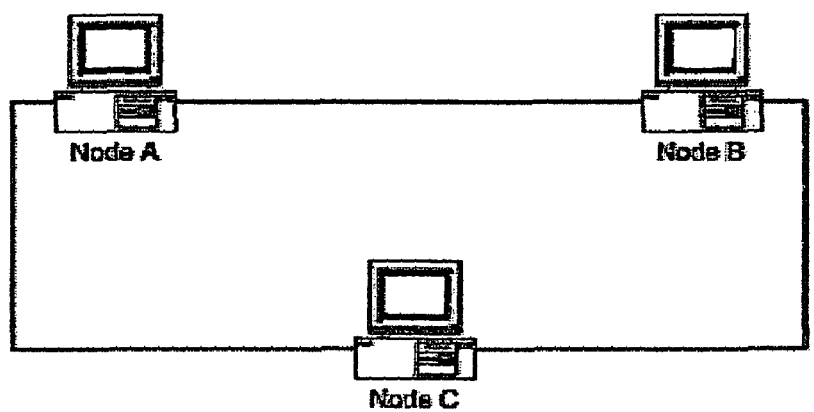
FIG. 3 is a simplified schematic view of a peer to peer, nonproxy, loop network.

Referring to FIG. 3, it is possible for a first node to be connected to other nodes which are within non-optimal distances from each other and these other nodes themselves having a second path to the first node. Other non-optimal connections are possible but the result of that is the first node would receive duplicate communications messages. It would benefit the first node if it could detect this situation, thus, in another embodiment of the invention, the first node maintains a count of duplicate communication messages which are received from each node. At intervals the first node will use the amount of duplicate communication messages in a preconfigured equation such as a comparison to a value, which value can be preconfigured by the operator, a value generated by a mathematical calculation based on other values or it can be in relation to other values. The comparison can be any comparison, for instance greater or less than or an average of.

If using the equation, the node detects the connection is not optimal or meeting a certain criteria the first node will disconnect that connection.

It is possible for a first node to connect to a second node which is not connected to any other nodes or the second node may be configured to not forward any communications. In this situation the second node would be deemed unproductive. Thus, in another embodiment of the invention, the first node maintains a count of received communications messages for its connections. At intervals the first node will use the amount of received communication messages in a preconfigured equation such as a comparison to a value. This value can be preconfigured by the operator, it can be a value generated by a mathematical calculation based on other values or it can be in relation to other values. The comparison can be any comparison, for instance greater or less than or an average of. If using the equation, the node detects the connection is not optimal or meeting a certain criteria the first node will disconnect that connection.

In another embodiment the first node maintains a count of searches it has received from each connection. At intervals the first node will use these counts in a preconfigured equation such as a comparison to a value. This value can be preconfigured by the operator, it can be a value generated by a mathematical calculation based on other values or it can be in relation to other values. The comparison can be any comparison, for instance greater or less than or an average of. If using the equation, the node detects the connection is not optimal or meeting a certain criteria the first node will disconnect that connection.

In another embodiment the first node maintains the last time the node received a communication message on a specific connection. At intervals the first node will use the last transmission time in a preconfigured equation such as a comparison to a value, which value can be preconfigured by the operator, generated by a mathematical calculation based on other values or it can be in relation to other values. The comparison can be any comparison, for example greater or less than or an average of. If using the equation, the node detects the connection is not optimal or meeting a certain criteria the first node will disconnect that connection.

In some situations it may be preferable to drop connections that are not performing as well as the average of other connections or connections that are not performing within a certain percentage of the average of other connections or against a predefined performance range. Thus, in such a case, in another embodiment, the first node would keep specific communications statistics on its connections and at intervals calculate the average of these statistics and drop those connections that are below average or drop those connections that are below some percentage of the average.

Sometimes a node can get overloaded processing communications on peer to peer networks. In this situation it would be advantageous to be able to split the load of processing communications. Accordingly, in another embodiment of the invention, multiple nodes can connect to the network at different points and share the load. These multiple nodes would maintain communications paths between themselves or to a master node and transmit and receive information about what other network nodes and where each node is connected. This would allow multiple nodes to share the load. These nodes may also report back to a master node with the searches they are processing.

When connecting many times to a network, a load is placed on the resources of the node in relation to the number of connection attempts are occurring at one time. It would be a benefit to the node if it had some way to control or throttle multiple connection attempts to the network. In this embodiment of the invention, the node is configured for a set number of concurrent connection attempts. As connections are accepted, the node will add new connection attempts to maintain this set value. Without this method, a node wishing to connect to 1,000 other nodes would attempt 1,000 concurrent connections. With the method, and configured for a maximum number of 50 concurrent connections, the node would attempt 50 concurrent connection attempts to the network. As these connection attempts succeeded or failed the node would add enough new connection attempts to reach the set limit of 50. Once the limit of 1,000 connections are established the node would not attempt any further connections.

Although limiting and controlling the concurrent number of connection attempts by the node reduces load, it is sometimes desired to initially start with a large number of concurrent connection attempts and then limit the number to a set value. In another embodiment the node is configured to attempt only a set number of concurrent connection attempts. When the connection attempts first start, the node attempts as many connections as possible until the number of successful connections reaches some value. This value can be preconfigured by the operator, generated by a mathematical calculation based on other values, or it can be in relation to other values. Once this value is reached the node will reduce its attempts to the limited concurrent connection method described above.

In many cases, a first node may connect to a second node and after some time the second node may stop transmitting without the first node knowing of such occurrence. This second node may stop transmitting because of technical problems or it may stop transmitting because it is no longer being utilized. It would be a benefit to the first node to drop the connection just as a precaution after some time has past. In one embodiment the first node is configured to keep track of when it connected to a second node. After some configured or calculated time limit is reached, the first node drops the connection and attempts to connect to either the same node again or to a different node.

As nodes connect to the network they are constantly receiving address information about other nodes to which it can be potentially connected. As these new nodes are discovered they are added to a cache. This cache is used to provide the node with potential new connections. Some nodes have a set limit on the number concurrent connections they can have. Should their set limit be reached they will not connect to any further nodes but they will continue to add any newly discovered nodes to their cache. Should a node maintain very long connections, nodes in this cache may become invalid for various reasons. When the node finally looses connections and attempts to connect to nodes in the cache, resources are consumed and wasted because the nodes are invalid. Thus, in yet another embodiment, the node is configured to add nodes to its cache as normal but also configured to clear this cache at set intervals or when the cache reaches a certain limit. By constantly clearing the cache a reduction in invalid nodes is achieved.

EXAMPLES

The following Examples illustrate various embodiments of the methods according to the present Invention.

Example 1

Figure 5:
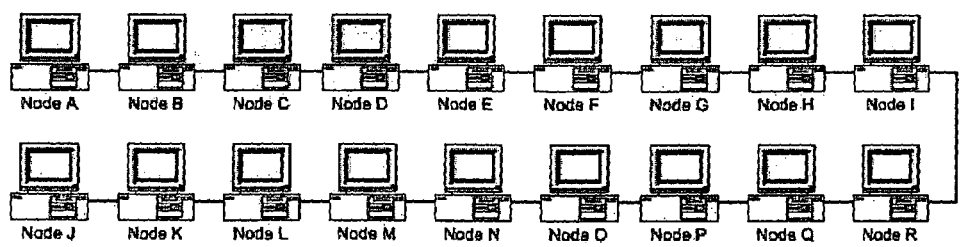
FIG. 5 is a simplified schematic of a peer to peer network consisting of more than 5 hops.

Referring to FIG. 5, this example illustrates a method for obtaining hop information from search requests and using this information to optimally connect to the network.

In this example node A is connected to node B and wishes to optimally connect into the rest of the network. The network is configured to allow communication messages to travel a maximum of 5 hops so node A is configured to look for nodes 5 hops away. Each node contains a file called "Samuel.txt." Node A sends out a search message to the network via node B with the term "Samuel.txt." Nodes A, B, C, D, E and F all respond. Node A reviews each search response and finds that node F is 5 hops away. Node A connects to node F. Node A sends out a search message to the network via node F with the term "Samuel.txt." Nodes B, C, D, E, F, G, H, I and R respond. Node A reviews each search response and finds that nodes B and R are 5 hops away. Node A knows that it is already connected to node B so it connects only to node R. Node A sends out a search message to the network via node R with the term "Samuel.txt." Nodes F, G, H, I, R, Q, P, O and N respond. Node A reviews each search response and finds that nodes F and N are 5 hops away. Node A knows that it is already connected to node F so it connects only to node N. Node A sends out a search message to the network via node N with the term "Samuel.txt." Nodes J, K, L, M, N, O, P, Q, and R respond. Node A reviews each search response and finds that nodes J and R are 5 hops away. Node A knows that it is already connected to node R so it connects only to node J. Node A sends out a search message to the network via node J with the term "Samuel.txt." Nodes J, K, L, M, and N respond. Node A reviews each search response and finds that node N is 5 hops away. Node A knows that it is already connected to node N so it does not connect. Node A is now within 5 hops of all nodes and will receive all communications from all nodes.

Example 2

Referring again to FIG. 5, example 2 illustrates a method for obtaining hop information from pings and using this information to optimally connect to the network In this example, node A is connected into node B and wishes to optimally connect into the rest of the network. The network is configured to allow communication messages to travel a maximum of 5 hops so node A is configured to look for nodes 5 hops away. Node A sends out a ping message to the network via node B. Nodes A, B, C, D, E and F all respond. Node A reviews each response and finds that node F is 5 hops away. Node A connects to node F. Node A sends out a ping to the network via node F. Nodes B, C, D, E, F, G, H, I and R respond. Node A reviews each response and finds that nodes B and R are 5 hops away. Node A knows that it is already connected to node B so it connects only to node R. Node A sends out a ping message to the network via node R. Nodes F, G, H, I, R, Q, P, O and N respond. Node A reviews each response and finds that nodes F and N are 5 hops away. Node A knows that it is already connected to node F so it connects only to node N. Node A sends out a ping message to the network via node N. Nodes J, K, L, M, N, O, P, Q, and R respond. Node A reviews each response and finds that nodes J and R are 5 hops away. Node A knows that it is already connected to node R so it connects only to node J. Node A sends out a ping message to the network via node J. Nodes J, K, L, M, and N respond. Node A reviews each response and finds that node N is 5 hops away. Node A knows that it is already connected to node N so it does not connect. Node A is now within 5 hops of all nodes and will receive all communications from all nodes.

Example 3

Referring to FIG. 5, example 3 illustrates a method for locating other nodes so that more connection options exist.

In this example Node A wishes to find other nodes to connect to. Node A is already connected to node B. The network is configured to allow communication messages to travel a maximum of 5 hops. Each node contains a file called "Samuel.txt." Node A sends out a search message to the network via node B with the term "Samuel.txt." Nodes A, B, C, D, E and F all respond. Node A reviews each search response and uses the address information contain in the message to connect to these nodes.

Example 4

Figure 2:
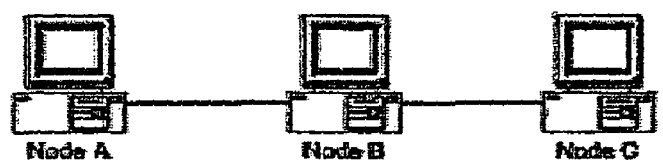
FIG. 2 is a simplified schematic of a peer to peer proxy network.

Referring to FIGS. 2 and 3, example 4 illustrates a method for optimizing a node's connections by looking at the number of duplicate messages that exist.

Referring to FIG. 3, B seeks to locate the file "Samuel.txt" and sends a search request out both of its connections to nodes A and C. Node C receives the search request. Node A receives the search request. Node A forwards the search request to node C. Node C records that it has received a duplicate message from node A. Node C finds that it has been configured to drop connections when it receives 1 duplicate message so it drops the connection to node A. Node C can still see searches from node A because they will travel through node B. Now referring to FIG. 2, the end result is that only one connection is needed to receive all communications from the network.

Example 5

Figure 4:
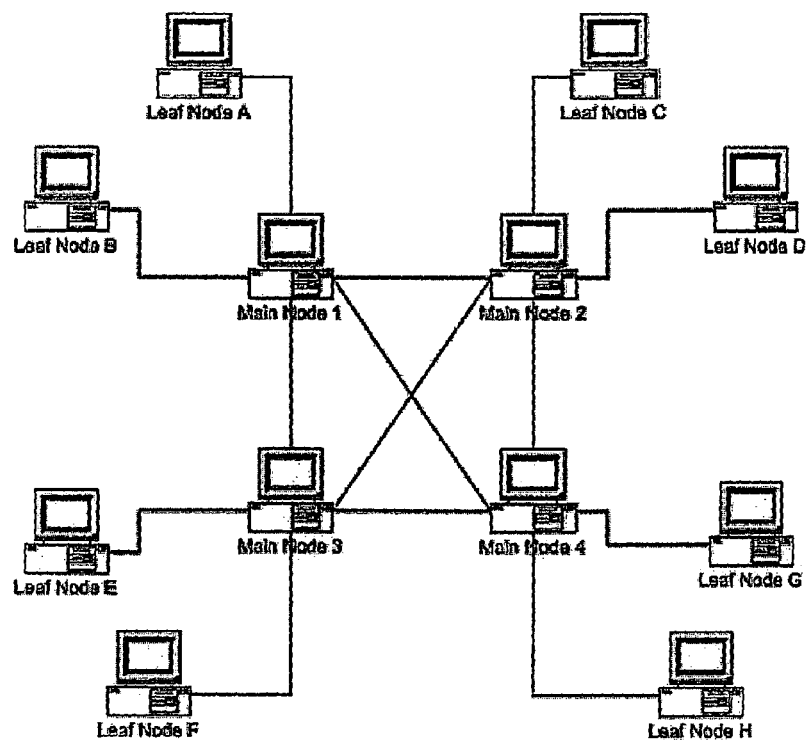
FIG. 4 is a simplified schematic of a peer to peer leaf/main node network.

Referring to FIG. 4, example 5 illustrates a method for optimizing a node's connections by monitoring the number of communication messages received on a connection.

In this example, main node 4 wishes to optimize its connections by monitoring how many communication messages it is receiving from all connections and comparing them to an average. If a connection does not meet the average it will disconnect the connection. Main node 4 records the following statistics:
  Main node 2 has sent 1 communication message
  Main node 3 has sent 1 communication message
  Leaf node G has sent 1 communication message
  Leaf node H has sent 1 communication message
Main node 4 then waits, for example, 5 minutes, and records the following statistics:
  Main node 2 has sent 51 communication messages
  Main node 3 has sent 53 communication messages
  Leaf node G has sent 54 communication messages
  Leaf node H has sent 1 communications message
Main node 4 adds the delta of all messages together and divides by 4 to get an average of 38.75. Because main node 4 is configured to drop any connections below the average, it will drop the connection to leaf node H.

Example 6

Referring again to FIG. 4, example 6, illustrates a method for optimizing a node's connections by monitoring the time of the last transmission received on a connection.

In this example, main node 4 is programmed to optimize its connections by monitoring when the last time its connections received a communication message and comparing them to a value. If a connection has not received any communication messages within 1 minute the node will drop the connection. Main node 4 records the following statistics:
  Main node 2 has sent 1 communication message
  Main node 3 has sent 1 communication message
  Leaf node G has sent 1 communication message
  Leaf node H has sent 1 communication message
Main node 4 then waits 1 minute and records the following statistics:
  Main node 2 has sent 51 communication messages
  Main node 3 has sent 53 communication messages
  Leaf node G has sent 54 communication messages
  Leaf node H has sent 1 communications message
Because main node 4 is configured to drop any connections that have not received any communication messages within 1 minute it will drop the connection to leaf node H.

Example 7

Referring to FIG. 4 again, example 7 illustrates a method for optimizing a node's connections by monitoring the number of search requests received on its connections.

In this example, main node 4 is programmed to optimize its connections by monitoring how many search requests it is receiving from all connections and comparing them to an average. If a connection does not meet the average it will disconnect the connection. Main node 4 records the following statistics:
  Main node 2 has sent 1 search request
  Main node 3 has sent 1 search request
  Leaf node G has sent 1 search request
  Leaf node H has sent 1 search request
Main node 4 then waits, 5 minutes and records the following statistics:
  Main node 2 has sent 51 search request
  Main node 3 has sent 53 search request
  Leaf node G has sent 54 search request
  Leaf node H has sent 1 search request
Main node 4 adds the delta of all messages together and divides by 4 to get an average of 38.75. Because main node 4 is configured to drop any connections below the average, it will drop the connection to leaf node H.

Example 8

Figure 6:
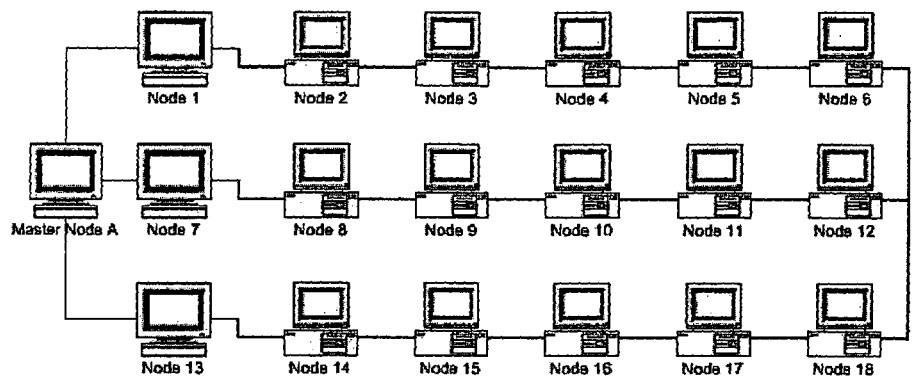
FIG. 6 is a simplified schematic of a peer to peer network with nodes sharing the load.

Referring to FIG. 6, example 8 illustrates a method for splitting the load among multiple nodes and reporting the information to a master node. The master node also keeps track of which network nodes the load sharing nodes are connected to.

Here, Nodes 1, 7 and 13 are depicted as sharing the load of monitoring a network at optimal points. Node 1 is connected to node 2 and reports this information to master node A. Node 7 is connected to node 8 and reports this information to master node A. Node 13 is connected to node 14 and reports this information to master node A. Node 7 wishes to connect to node 2 and sends this request to master node A. Master node A knows that node 1 is connected to node 2 and denies the request.

Node 2 issues a search request for "samuel.txt." Node 1 receives this communications message and forwards it to master node A. Master node A records the information. Node 17 issues a search request for "bob.txt." Node 13 receives this communication message and forwards it to master node A. Master node A records this information.

Example 9

Figure 7:
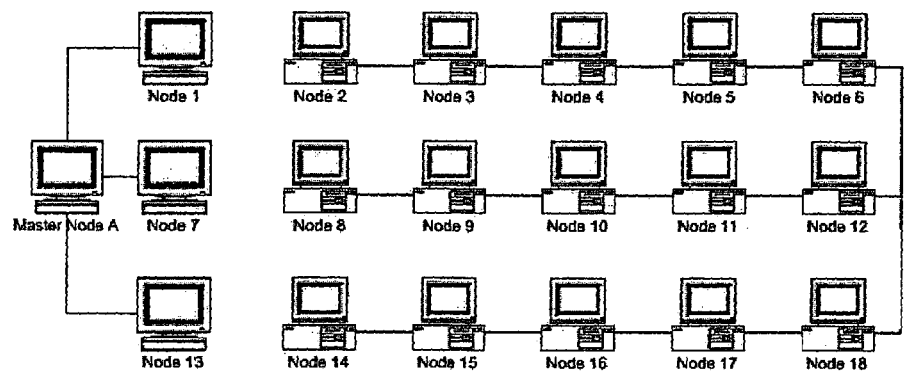
FIG. 7 is a simplified schematic of a peer to peer network with nodes sharing the load but not yet connected.

Referring to FIGS. 6 and 7, example 9 illustrates a method for splitting the load among multiple nodes and reporting the information to a master node. The master node also informs the load sharings nodes which network nodes to connect to.

Referring first to FIG. 7, in this example Nodes 1, 7 and 13 wish to join the network. Nodes 1, 7 and 13 send communication messages to master node A requesting clients to connect to. Master node A replies to node 1 with connection information for node 2. Master node A replies to node 7 with connection information for node 8. Master node A replies to node 13 with connection information for node 14.

Nodes 1, 7 and 13 connect and are sharing the load of monitoring a network at optimal points. Node 1 is connected to node 2 and reports this information to master node A. Node 7 is connected to node 8 and reports this information to master node a. Node 13 is connected to node 14 and reports this information to master node A. Node 7 wishes to connect to node 2 and sends this request to master node A. Master node A knows that node 1 is connected to node 2 and denies the request.

Node 2 issues a search request for "samuel.txt." Node 1 receives this communications message and forwards it to master node A. Master node A records the information. Node 17 issues a search request for "bob.txt." Node 13 receives this communication message and forwards it to master node A. Master node A records this information.

Example 10

Figure 8:
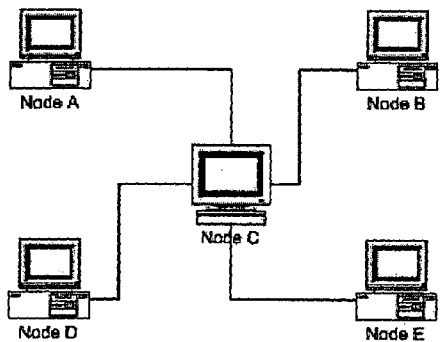
FIG. 8 is a simplified schematic of a peer to network with a node throttling its connections.

Referring to FIG. 8, example 10 illustrates a method for throttling connection attempts to a network.

In this example node C wishes to connect to a maximum of four other nodes. In its cache it has the following entries:
Node A
Node H
Node L
Node V
Node B
Node O
Node E
Node D Node C is configured to only have a maximum of 2 concurrent connection attempts and to wait 10 seconds for each connection attempt. Node C attempts to connect to node A and node H. Node C connects to node A and establishes a connection. Node C continues to wait for the connection attempt to node H. Because Node C connected to node A, there is now one empty connection slot so node C attempts to connect to Node V. The connection attempt to node H fails so there is now one empty connection slot. Node C attempts to connect to node B and this connection attempt succeeds. Because once again there is one empty connection slot node C attempts to connect to node O. An error occurs immediately and at the same time the connection attempt to node V fails as well. There are now two empty connection slots available. Node C attempts to connect to node E and node D. Node C's connection attempt with node D is successful. After 10 seconds, the connection attempt to node E fails.

While presently preferred embodiments have been described and depicted, the invention may be otherwise embodied within the scope of the following claims:

What is claimed is:

1. A method comprising the steps of:
   at a first peer node in a peer-to-peer network having a plurality of peer nodes in which connections among some of the peer nodes cannot be formed because a number of hops among such nodes is more than a maximum number of hops allowed for the peer-to-peer network:
   A. grouping the plurality of peer nodes into first and second sub-peer networks by:
   connecting to a second peer node to form a first direct connection;
   issuing a first search message to the second peer node requesting the second peer node to forward the search message to other peer nodes of the second peer node;
   receiving a first set of responses from the second peer node including responses from the other peer nodes of the second peer node;
   determining from peer node distance information provided in the first set of responses which of the other peer nodes of the second peer node is a determined peer node, such that a number of hops along a path from the first peer node to the second peer node to the determined peer node is equal to a maximum number of hops that the search message can be forwarded using the first direct connection to the second peer node;
   adding to the first sub-peer network, the second node and peers of the second node but not the determined peer node, wherein each node of the first sub-peer network is less than the maximum number of hops away from the first peer node;
   connecting directly to the determined peer node to form a second direct connection that is in addition to the first direct connection to the second peer node;
   issuing a second search message to the determined peer node requesting the determined peer node to forward the second search message to other peer nodes of the determined peer node;
   receiving a second set of responses from the determined peer node including responses from the other peer nodes of the determined peer node;
   determining from peer node distance information provided in the second set of responses which of the peer nodes of the determined peer node is a second determined peer node, such that a number of hops from the first node to the determined peer node to the second determined peer node is equal to a maximum number of hops that the second search message can be forwarded using the second direct connection;
   adding to the second sub-peer network, the determined peer node and peers of the determined peer node but not the second determined peer node, wherein each node of the second sub-peer network is less than the maximum number of hops away from the first peer node;
   B. controlling connections among the plurality of peer nodes of the first and second sub-peer networks by:
   receiving from the plurality of peer nodes, information about connections among the plurality of peer nodes within each of the sub-peer networks;
   maintaining the connection information; and
   accepting and denying a search request received by the first peer node from a requesting peer node requesting to connect to another peer node located in a sub-peer network different from the requesting peer node and the first peer node, the accepting and denying based on the connection information maintained by the first peer node and received from peer nodes other than the requesting peer node.

2. A method as set forth in claim 1 further comprising:
   g. keeping a statistic on at least one connection between the first node and at least one peer node connected to the first peer node;

h. using the statistic for making a decision to disconnect the connected peer node; and
i. disconnecting the connected peer node in response to the decision.

3. A method as set forth in claim 2 wherein the statistic is a number of received communications messages.

4. A method as set forth in claim 2 wherein the statistic is a last time a transmission was received.

5. A method as set forth in claim 2 wherein the statistic is a number of searches received.

6. A method as set forth in claim 2 wherein the statistic is based on an average or within a percentage of an average of other connections.

7. A method as set forth in claim 2 wherein the decision is based on the statistic being of a lower value compared to statistics of other connections with other peer nodes.

8. A method as set forth in claim 1 further comprising:
storing a list of peer nodes for the first peer node to connect with;
attempting to make at least one connection to at least one peer node from the list of peer nodes; and
waiting for a fixed duration of time in response to a failed connection attempt before attempting to make a connection to another peer node from the list of peer nodes.

9. A method as set forth in claim 8 wherein the connection attempt is made concurrently to two nodes on the list.

10. A method as set forth in claim 1 wherein the first and second search messages comprise a predefined search term.

11. A method as set forth in claim 1 wherein the first and second search messages comprise a ping request.

12. A method as set forth in claim 1 further including disconnecting a connection of the determined peer node in response to receiving a duplicate search message.

13. A method as set forth in claim 1 further including:
splitting a communications load amongst load sharing peer nodes, each of the load sharing peer nodes being a node amongst the plurality of peer nodes that is directly connected to the first peer node; and
each load sharing peer node monitoring a respective one of the first and second sub-peer networks for network communications.

14. A method as set forth in claim 13 wherein each of the load sharing peer nodes is in communication with the first node.

15. A method as set forth in claim 14 wherein the first node receives the network communications from the load sharing peer nodes.

* * * * *